United States Patent
Austad et al.

(10) Patent No.: US 12,479,806 B2
(45) Date of Patent: Nov. 25, 2025

(54) PROCESS FOR PREPARING XPO1 INHIBITORS AND INTERMEDIATES FOR USE IN THE PREPARATION OF XPO1 INHIBITORS

(71) Applicant: Karyopharm Therapeutics Inc., Newton, MA (US)

(72) Inventors: Brian C. Austad, Tewksbury, MA (US); David G. Roe, Rockwood (CA)

(73) Assignee: Karyopharm Therapeutics Inc., Newton, MA (US)

( * ) Notice: Subject to any disclaimer, the term of this patent is extended or adjusted under 35 U.S.C. 154(b) by 904 days.

(21) Appl. No.: 17/607,670

(22) PCT Filed: May 1, 2020

(86) PCT No.: PCT/US2020/031124
§ 371 (c)(1),
(2) Date: Oct. 29, 2021

(87) PCT Pub. No.: WO2020/223678
PCT Pub. Date: Nov. 5, 2020

(65) Prior Publication Data
US 2022/0242832 A1    Aug. 4, 2022

Related U.S. Application Data

(60) Provisional application No. 62/841,649, filed on May 1, 2019.

(51) Int. Cl.
*C07D 249/08* (2006.01)
*C07D 403/12* (2006.01)

(52) U.S. Cl.
CPC ......... *C07D 249/08* (2013.01); *C07D 403/12* (2013.01); *C07B 2200/13* (2013.01)

(58) Field of Classification Search
CPC .. C07D 249/08; C07D 403/12; C07B 2200/13
(Continued)

(56) References Cited

U.S. PATENT DOCUMENTS 8,513,230 B2    8/2013   Shacham et al.
8,999,996 B2    4/2015   Sandanayaka et al.
(Continued)

FOREIGN PATENT DOCUMENTS

WO    WO-2011/109799 A1    9/2011
WO    WO-2012/099807 A1    7/2012
(Continued)

OTHER PUBLICATIONS

Shi, "Synthesis of Trans-4-styrylpyridine in DMSO with KOH as Catalyst," Journal of Tianjin Normal University (Natural Science Edition) 24.4 (2004): 14-17.

*Primary Examiner* — Taylor V Oh
(74) *Attorney, Agent, or Firm* — FOLEY HOAG LLP (57) ABSTRACT

The present invention provides an improved process for preparation of the (Z)-3-(3-(3,5-bis(trifluoromethyl)phenyl)-1H-1,2,4-triazol-1-yl)acrylic acid (referred to as compound of the structural formula (III)), which is a useful key intermediate for the synthesis of Selinexor ((Z)-3-(3-(3,5-Bis(trifluoromethyl)phenyl)-1H-1,2,4-triazol-1-yl)-N-(pyrazin-2-yl)acrylohydrazide). The process comprises reaction of the compound of the structural formula (I) (as described herein) with the compound of the structural formula (II) (as described herein) in the presence of a catalyst, an organic base and an ether-containing solvent. The subsequent hydrolysis of the formed compound of the structural formula (IIIa) (as described herein) is performed without isolation of the compound of the structural formula (IIIa), providing compound of the structural formula (III) in high yield and stereoselectivity.

(Continued)

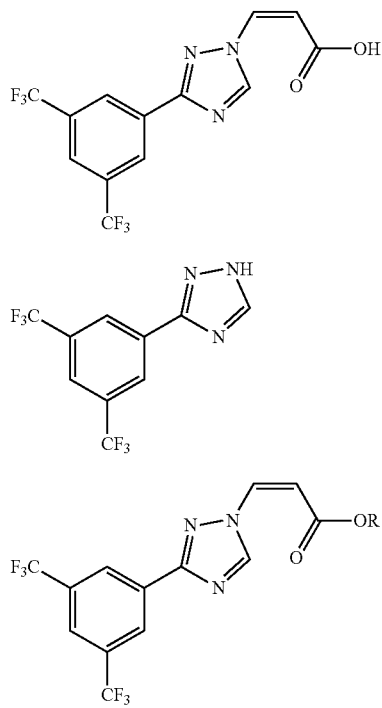

12 Claims, 2 Drawing Sheets

(58) Field of Classification Search
USPC .......................................................... 544/405
See application file for complete search history.

(56) References Cited

U.S. PATENT DOCUMENTS

| | | | |
|---|---|---|---|
| 9,079,865 | B2 | 7/2015 | Sandanayaka et al. |
| 9,206,158 | B2 | 12/2015 | Sandanayaka et al. |
| 9,303,000 | B2 | 4/2016 | Sandanayaka et al. |
| 9,428,490 | B2 | 8/2016 | Sandanayaka et al. |
| 9,550,757 | B2 | 1/2017 | Shacham et al. |
| 9,714,226 | B2 | 7/2017 | Sandanayaka et al. |
| 9,738,624 | B2 | 8/2017 | Baloglu et al. |
| 10,173,987 | B2 | 1/2019 | Sandanayaka et al. |
| 10,202,366 | B2 | 2/2019 | Rashal et al. |
| 10,407,405 | B2 | 9/2019 | Baloglu et al. |
| 10,519,139 | B2 | 12/2019 | Austad et al. |
| 10,544,108 | B2 | 1/2020 | Sandanayaka et al. |
| 11,034,660 | B2 | 6/2021 | Sandanayaka et al. |
| 11,078,190 | B2 | 8/2021 | Austad et al. |
| 11,124,493 | B2 | 9/2021 | Baloglu et al. |
| 11,746,102 | B2 | 9/2023 | Austad et al. |
| 11,753,401 | B2 | 9/2023 | Austad et al. |
| 11,787,771 | B2 | 10/2023 | Sandanayaka et al. |
| 11,807,629 | B2 | 11/2023 | Austad et al. |
| 11,945,794 | B2 | 4/2024 | Baloglu et al. |
| 12,291,508 | B2 | 5/2025 | Sandanayaka et al. |
| 2022/0056038 | A1 | 2/2022 | Sandanayaka et al. |
| 2024/0208943 | A1 | 6/2024 | Austad et al. |
| 2024/0376114 | A1 | 11/2024 | Sandanayaka et al. |
| 2025/0059158 | A1 | 2/2025 | Baloglu et al. |

FOREIGN PATENT DOCUMENTS

| | | |
|---|---|---|
| WO | WO-2013/019548 A1 | 2/2013 |
| WO | WO-2013/019561 A1 | 2/2013 |
| WO | WO-2013/170068 A2 | 11/2013 |
| WO | WO-2014/144772 A1 | 9/2014 |
| WO | WO-2014/205389 A1 | 12/2014 |
| WO | WO-2014/205393 A1 | 12/2014 |
| WO | WO-2016/025904 A1 | 2/2016 |
| WO | WO-2017/117529 A1 | 7/2017 |
| WO | WO-2017/117535 A1 | 7/2017 |
| WO | WO-2017/118940 A1 | 7/2017 |
| WO | WO-2018/129227 A1 | 7/2018 |
| WO | WO-2020/223678 A1 | 11/2020 |

PROCESS FOR PREPARING XPO1 INHIBITORS AND INTERMEDIATES FOR USE IN THE PREPARATION OF XPO1 INHIBITORS

RELATED APPLICATION

This application is the U.S. National Stage of International Application No. PCT/US2020/031124, filed May 1, 2020, which designates the U.S., published in English, and claims the benefit of U.S. Provisional Application No. 62/841,649, filed on May 1, 2019. The entire teachings of the above applications are incorporated herein by reference.

BACKGROUND OF THE INVENTION

Selinexor is a selective inhibitor of nuclear export used in the treatment and/or prevention of physiological conditions associated with CRM1/XPO1 activity. Selinexor is represented by the following structural formula:

The synthesis of selinexor was first disclosed in WO2013019548A1 by Karyopharm Therapeutics Inc. Although the synthetic methods reported therein were successful in providing small quantities of selinexor, they suffered from the need for multiple purification steps (chromatography and crystallization) to provide selinexor with the desired high Z-isomeric content. Although well suited for their intended scale, these purification steps render the process disclosed in this application inefficient for commercial manufacturing purposes.

An improved synthesis of selinexor from its penultimate intermediate (represented by structural formula III below) is disclosed in WO2016025904A1, also authored by Karyopharm Therapeutics Inc. Though challenges associated with the final synthetic stage that converts intermediate III to selinexor are addressed, methods to prepare intermediate III are not provided.

SUMMARY OF THE INVENTION

A need exists for efficient manufacturing processes suitable for preparation of selinexor and its intermediates on a commercially relevant scale.

It is an object of the present invention to provide novel, efficient processes for preparing intermediates (e.g., the compound represented by structural formula III) useful in the synthesis of selinexor. These processes address the challenges associated with prior syntheses of selinexor.

The present invention relates to a process of making a compound represented by structural formula III, the process comprising:
reacting a compound represented by structural formula (I) with a compound represented by structural formula (II), in the presence of a catalyst, an organic base, and an ether-containing solvent under conditions suitable to produce a compound represented by structural formula (IIIa), and
without isolating, reacting the compound represented by structural formula (IIIa) with an inorganic base in the presence of isopropyl alcohol (IPA) under conditions suitable to produce a compound represented by structural formula (III); and isolating the compound represented by structural formula (III), wherein R is a $C_2$-$C_5$ alkyl, a $C_6$-$C_{18}$ aryl, a 5-18 member heteroaryl, a $C_3$-$C_{12}$ cycloalkyl, or a 3-12 member heterocycloalkyl, each of which is optionally and independently substituted with one or more substituents selected from halo, CN, OH, $C_1$-$C_3$ alkyl, $C_1$-$C_3$ haloalkyl, —$NO_2$, —$NH_2$, —NH($C_1$-$C_3$ alkyl), —N($C_1$-$C_3$ alkyl)$_2$, and $C_1$-$C_3$ alkoxy.

As described in the examples, hereinbelow, employing a combination of a catalyst, an organic base, an ether-containing solvent, an inorganic base, and a phase transfer catalyst in the methods of synthesis of the compound represented by structural formula III unexpectedly resulted in an advantageously high yield and excellent stereoselectivity, while eliminating a step of isolating an intermediate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
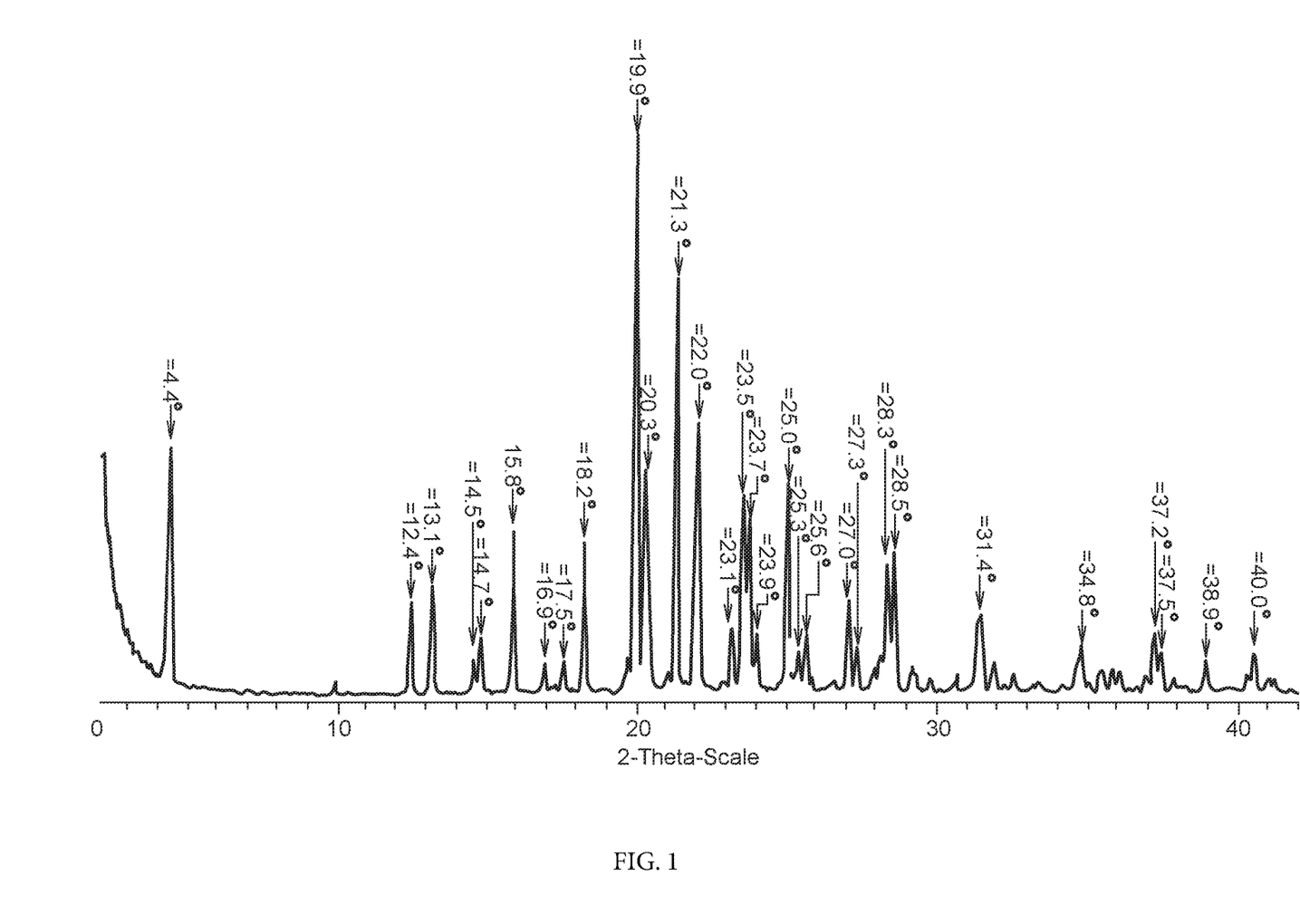
FIG. 1 is an X-ray powder diffraction (XRPD) pattern of Selinexor Form A as described in U.S. Pat. No. 10,519,139.
Figure 2:
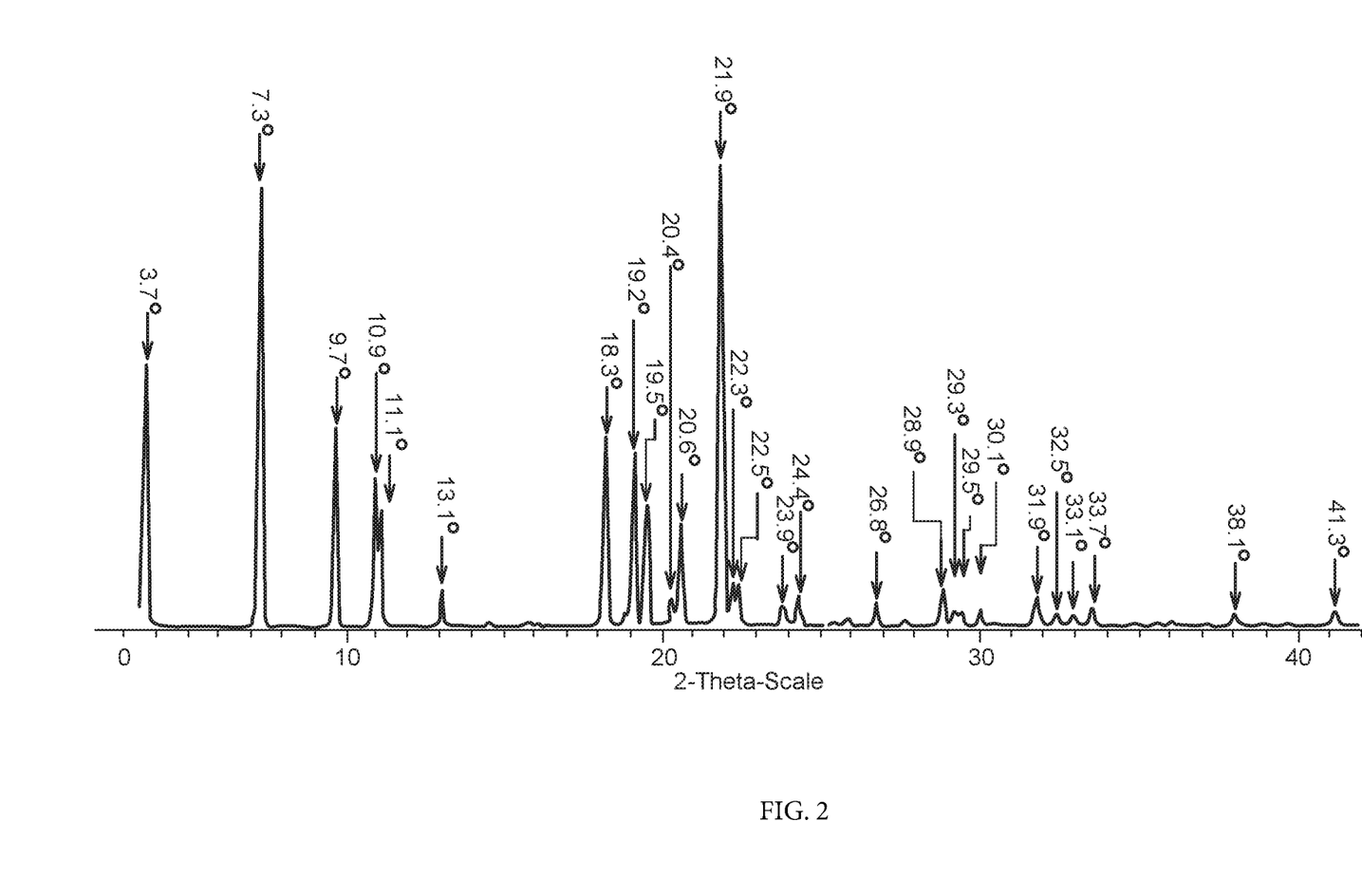
FIG. 2 is an XRPD pattern of an acetonitrile solvate of Selinexor, as described in U.S. Pat. No. 10,519,139.

The novel features of the present invention will become apparent to those of skill in the art upon examination of the following detailed description of the invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

Definitions

Compounds of this invention include those described generally above, and are further illustrated by the classes, subclasses, and species disclosed herein. As used herein, the following definitions shall apply unless otherwise indicated. For purposes of this invention, the chemical elements are identified in accordance with the Periodic Table of the Elements, CAS version, Handbook of Chemistry and Physics, $75^{th}$ Ed. Additionally, general principles of organic chemistry are described in "Organic Chemistry", Thomas Sorrell, University Science Books, Sausalito: 1999, and "March's Advanced Organic Chemistry", $5^{th}$ Ed., Ed.: Smith, M. B. and March, J., John Wiley & Sons, New York: 2001, the entire contents of which are hereby incorporated by reference.

Unless specified otherwise within this specification, the nomenclature used in this specification generally follows the examples and rules stated in Nomenclature of Organic Chemistry, Sections A, B, C, D, E, F, and H, Pergamon Press, Oxford, 1979, which is incorporated by reference herein for its exemplary chemical structure names and rules on naming chemical structures. Optionally, a name of a compound may be generated using a chemical naming program: ACD/ChemSketch, Version 5.09/September 2001, Advanced Chemistry Development, Inc., Toronto, Canada.

"Alkyl" means a saturated aliphatic branched or straight-chain monovalent hydrocarbon radical, having, for example, 1 to 16 carbon atoms. For example, "$(C_1-C_6)$alkyl" means a radical having from 1-6 carbon atoms in a linear or branched arrangement. "$(C_1-C_6)$alkyl" includes methyl, ethyl, propyl, butyl, pentyl, and hexyl. In one aspect, an alkyl group contains 2-5 carbon atoms.

"Alkane" means a hydrocarbon molecule consisting of an alkyl radical, as defined above, bound to a hydrogen.

"Cycloalkyl" means a saturated aliphatic cyclic hydrocarbon radical, for example, having 3-12 carbon atoms. It can be monocyclic or polycyclic (e.g., fused, bridged, or spiro). For example, monocyclic $(C_3-C_8)$cycloalkyl means a radical having from 3-8 carbon atoms arranged in a monocyclic ring. Monocyclic $(C_3-C_8)$cycloalkyl includes but is not limited to cyclopropyl, cyclobutyl, cyclopentyl, cyclohexyl, cycloheptyl and cyclooctane.

"Cycloalkane" means a hydrocarbon molecule consisting of a cycloalkyl radical as defined above bound to a hydrogen.

"Heterocycloalkyl" means a saturated ring, having, for example, 3 to 12 members, and containing carbon atoms and 1 to 4 heteroatoms, which may be the same or different, selected from N, O or S and optionally containing one or more double bonds. It can be monocyclic or polycyclic (e.g., fused, bridged, or spiro).

"Haloalkyl" refers to straight-chained or branched alkyl groups, as defined above, wherein the hydrogen atoms may be partially or entirely substituted with halogen atoms and include mono, poly, and perhaloalkyl groups where the halogens are independently selected from fluorine, chlorine, and bromine.

"Heteroaryl" means a monovalent heteroaromatic monocyclic or polycylic ring radical. Heteroaryl rings can have 5-18 members and contain carbon atoms and 1 to 4 heteroatoms independently selected from N, O, and S. They can be mono or polycyclic and include, but are not limited to furan, thiophene, pyrrole, imidazole, pyrazole, oxazole, isoxazole, thiazole, isothiazole, 1,2,3-triazole, 1,2,4-triazole, 1,3,4-oxadiazole, 1,2,5-thiadiazole, 1,2,5-thiadiazole 1-oxide, 1,2,5-thiadiazole 1,1-dioxide, 1,3,4-thiadiazole, pyridine, pyridine-N-oxide, pyrazine, pyrimidine, pyridazine, 1,2,4-triazine, 1,3,5-triazine, tetrazole, indolizine, indole, isoindole, benzo[b]furan, benzo[b]thiophene, indazole, benzimidazole, benzthiazole, purine, 4H-quinolizine, quinoline, isoquinoline, cinnoline, phthalazine, quinazoline, quinoxaline, 1,8-naphthyridine, and pteridine.

"Alkoxy" means an alkyl radical as defined above attached through an oxygen linking atom. "$(C_1-C_3)$-alkoxy" includes methoxy, ethoxy, propoxy, and isopropoxy.

"Aryl" means an aromatic monocyclic or polycyclic hydrocarbon ring system containing, for example, 6-18 carbon members. Aryl systems include, but not limited to, phenyl, naphthalenyl, fluorenyl, indenyl, azulenyl, and anthracenyl.

"Arene" means a hydrocarbon molecule consisting of an aryl radical bound to a hydrogen.

Also included within the definition of the radicals defined above are those radicals that are optionally substituted at carbon or nitrogen atoms, as permitted by valency. Suitable substitutions include, but are not limited to halo, CN, OH, $C_1-C_3$ alkyl, $C_1-C_3$ haloalkyl, $-NO_2$, $-NH_2$, $-NH(C_1-C_3$ alkyl), $-N(C_1-C_3$ alkyl)$_2$, and $C_1-C_3$ alkoxy.

"Halo" as used herein refers to fluorine, chlorine, bromine, or iodine.

The term "hydrocarbon solvent", as used herein, means an alkane, a cycloalkane, or an arene, having 5-12 carbon atoms.

"Catalyst" means any compound that is capable of modifying, especially by increasing, the rate of the chemical reaction in which it participates, and which is regenerated at the end of the reaction. Examples of catalysts suitable for the present application include, but are not limited to 1,5-diazabicyclo[4.3.0]non-5-ene (DBN), 1,4-diazabicyclo[2.2.2]octane (DABCO), 1,8-diazabicyclo[5.4.0]undec-7- ene (DBU), and 7-methyl-1,5,7-triazabicyclo[4.4.0]dec-5-ene (MTBD), 1,5,7-Triazabicyclo[4.4.0]dec-5-ene (TBD), and quinuclidine.

"Organic base" as used herein refers to an organic compound capable of accepting a proton, producing a hydroxyl ion in an aqueous solution, or donating an electron pair. Example of organic bases include, but are not limited to nitrogen-containing compounds, such as $Et_3N$, diisopropylethyamine (DIPEA), piperidine, pyridine, 4-dimethylaminopyridine (DMAP), N-methyl-morpholine, dimethylaniline, imidazole, 1-methylpyridine, 2-methylpyridine, 3-methylpyridine, 3,5-dimethylpyridine, 2,4-dimethylpyridine, 2,6-dimethylpyridine, and 2,4,6-trimethylpyridine.

"Inorganic base" as used herein refers to an inorganic compound capable of accepting a proton, producing a hydroxyl group in an aqueous medium, or donating an electron pair. Example of inorganic bases include, but are not limited to metal hydroxides, such as LiOH, NaOH, KOH, CsOH, $Ca(OH)_2$, $Mg(OH)_2$, and $Ba(OH)_2$.

"Ether-containing solvent" as used herein refers to an organic compound, which is liquid under ambient conditions, and which contains an R'—O—R" moiety, wherein R' and R" are each independently selected from linear or branched alkyls, or cycloalkyls, and R' and R" can form a 5- to 6-membered cycle together with the oxygen atom to which they are connected. Examples of ether-containing solvents include, but are not limited to 2-methyltetrahydrofuran (MeTHF), diethyl ether, methyl tert-butyl ether (MTBE), tetrahydrofuran (THF), 2,5-dimethyltetrahydrofuran (DiMeTHF), dimethoxyethane (DME), and cyclopentyl methyl ether (CPME).

It is understood that substituents and substitution patterns on the compounds of the invention can be selected by one of ordinary skill in the art to provide compounds that are chemically stable and that can be readily synthesized by techniques known in the art, as well as those methods set forth below. In general, the term "substituted," whether preceded by the term "optionally" or not, means that one or more hydrogens of the designated moiety are replaced with a suitable substituent. Unless otherwise indicated, an "optionally substituted group" can have a suitable substituent at each substitutable position of the group and, when more than one position in any given structure may be substituted with more than one substituent selected from a specified group, the substituent can be either the same or different at every position. Alternatively, an "optionally substituted group" can be unsubstituted.

Combinations of substituents envisioned by this invention are preferably those that result in the formation of stable or chemically feasible compounds. If a substituent is itself substituted with more than one group, it is understood that these multiple groups can be on the same carbon atom or on different carbon atoms, as long as a stable, chemically feasible structure results. The term "stable," as used herein, refers to compounds that are not substantially altered when subjected to conditions to allow for their production, detection, and, in certain embodiments, their recovery, purification, and use for one or more of the purposes disclosed herein.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers. Therefore, single stereochemical isomers as well as enantiomeric, diastereomeric, and geometric (or conformational) mixtures of the present compounds are within the scope of the invention. Unless otherwise stated, all tautomeric forms of the compounds of the invention are within the scope of the invention.

Additionally, unless otherwise stated, structures depicted herein are also meant to include compounds that differ only in the presence of one or more isotopically enriched atoms. For example, compounds produced by the replacement of a hydrogen with deuterium or tritium, or of a carbon with a $^{13}C$- or $^{14}C$-enriched carbon are within the scope of this invention. Such compounds are useful, for example, as analytical tools, as probes in biological assays, or as therapeutic agents in accordance with the present invention.

The term "stereoisomers" is a general term for all isomers of an individual molecule that differ only in the orientation of their atoms in space. It includes mirror image isomers (enantiomers), geometric (cis/trans) isomers and isomers of compounds with more than one chiral center that are not mirror images of one another (diastereomers).

When introducing elements disclosed herein, the articles "a," "an," "the," and "said" are intended to mean that there are one or more of the elements. The terms "comprising," "having" and "including" are intended to be open-ended and mean that there may be additional elements other than the listed elements.

Abbreviations aq. Aqueous
CPME Cyclopentyl methyl ether
DABCO 1,4-Diazabicyclo[2.2.2]octane
DD distilled, deionized
DIEA N,N-Diisopropyl ethylamine
DMF Dimethylformamide
EA or EtOAc Ethyl acetate
$Et_2O$ Diethyl ether
EtOH Ethanol
Et Ethyl
eq equivalent(s)
h hour(s)
HCl Hydrochloric acid
IPA 2-Propanol
KOH Potassium hydroxide
LCMS Liquid Chromatography/Mass Spectrometry
LiOH Lithium hydroxide
MeCN Acetonitrile
MeOH Methanol
MTBE Methyl tert-butyl ether
min minutes
Me Methyl
MeTHF 2-Methyltetrahydrofuran
NaOH Sodium hydroxide
NaCl Sodium chloride
NMT Not More Than
NLT Not Less Than
ND Not Detected
NMR Nuclear Magnetic Resonance
org. Organic
RT, rt, r.t. Room temperature
THF Tetrahydrofuran
Temp Temperature
UPLC Ultra Performance Liquid Chromatography or UHPLC
wts weight equivalents

Methods of the Invention

In a first embodiment, the present invention relates to a process of making a compound represented by structural formula III, the process comprising:
reacting a compound represented by structural formula (I) with a compound represented by structural formula (II), in the presence of a catalyst, an organic base, and an ether-containing solvent under the conditions suitable to produce a compound represented by structural formula (IIIa), and
without isolating, reacting the compound represented by structural formula (IIIa) with an inorganic base in the presence of isopropyl alcohol (IPA) under conditions suitable to produce a compound represented by structural formula (III); and isolating the compound represented by structural formula (III),
wherein R is a $C_2$-$C_5$ alkyl, a $C_6$-$C_{18}$ aryl, a 5-18 member heteroaryl, a $C_3$-$C_{12}$ cycloalkyl, or a 3-12 member heterocycloalkyl, each of which is optionally and independently substituted with one or more substituents selected from halo, CN, OH, $C_1$-$C_3$ alkyl, $C_1$-$C_3$ haloalkyl, —$NO_2$, —$NH_2$, —NH($C_1$-$C_3$ alkyl), —N($C_1$-$C_3$ alkyl)$_2$, and $C_1$-$C_3$ alkoxy.

In a first aspect of the first embodiment, R is a $C_2$-$C_5$ alkyl or a $C_6$-$C_{18}$ aryl. For example, R is a $C_2$-$C_5$ alkyl, for example, R is isopropyl. Alternatively, R is phenyl.

In a second aspect of the first embodiment, the catalyst is present in the amount from 0.05 to 0.2 molar equivalents based on the amount of the compound represented by structural formula I. For example, the catalyst is present in the amount of 0.1 molar equivalents based on the amount of compound represented by structural formula I. The remainder of the values and example values of the variables of the process are as described above with respect to the first aspect of the first embodiment.

In a third aspect of the first embodiment, the catalyst is selected from the group consisting of 1,5-diazabicyclo [4.3.0]non-5-ene, 1,4-diazabicyclo[2.2.2]octane (DABCO), 1,8-diazabicyclo[5.4.0]undec-7-ene, and 7-methyl-1,5,7-triazabicyclo[4.4.0]dec-5-ene. For example, the catalyst is DABCO. The remainder of the values and example values of the variables of the process are as described above with respect to the first and the second aspects of the first embodiment.

In a fourth aspect of the first embodiment, the organic base is present in the amount from 0.5 to 2 molar equivalents based on the amount of compound represented by structural formula I, e.g., the organic base is present in the amount of 1.0 molar equivalents based on the amount of compound represented by structural formula I. The remainder of the values and example values of the variables of the process are as described above with respect to the first through the third aspects of the first embodiment.

In a fifth aspect of the first embodiment, the organic base is selected from the group consisting of DIPEA, $Et_3N$, piperidine, pyridine, and 4-(dimethylamino)pyridine, e.g., the organic base is DIPEA. The remainder of the values and example values of the variables of the process are as described above with respect to the first through the fourth aspects of the first embodiment.

In a sixth aspect of the first embodiment, the ether-containing solvent is selected from the group consisting of MeTHF, CPME, and MTBE. For example, the ether-containing solvent is MeTHF. The remainder of the values and example values of the variables of the process are as described above with respect to the first through the fifth aspects of the first embodiment.

In a seventh aspect of the first embodiment, the compound of structural formula II is present in an amount from 1.0 to 1.5 molar equivalents based on the amount of compound of structural formula I. The remainder of the values and example values of the variables of the process are as described above with respect to the first through the sixth aspects of the first embodiment.

In an eighth aspect of the first embodiment, the inorganic base is KOH or NaOH. For example, the inorganic base is KOH. The remainder of the values and example values of the variables of the process are as described above with respect to the first through the seventh aspects of the first embodiment.

In a ninth aspect of the first embodiment, the present invention relates to the process, wherein the conditions suitable to produce a compound represented by structural formula IIIa include reacting the compound represented by structural formula I with the compound represented by structural formula II at a temperature from about 5° C. to about 55° C., such as from about 10° C. to about 40° C., such as from about 10° C. to about 30° C. (e.g., 10, 11, 12, 13, 14, 15, 16, 17, 18, 19, 20, 21, 22, 23, 24, 25, 26, 27, 28, 29 and 30). The remainder of the values and example values of the variables of the process are as described above with respect to the first through the eighth aspects of the first embodiment.

In a tenth aspect of the first embodiment, the conditions suitable to produce the compound represented by structural formula IIIa include reacting the compound represented by structural formula I with the compound represented by structural formula II for a period of time from about 5 hours to about 30 hours, such as from about 10 hours to about 30 hours, such as 10, 11, 12, 13, 14, 15, 16, 17, 18, 19, 20, 21, 22, 23, 24, 25, 26, 27, 28, 29 and 30). The remainder of the values and example values of the variables of the process are as described above with respect to the first through the ninth aspects of the first embodiment.

In an eleventh aspect of the first embodiment, the conditions suitable to produce the compound represented by structural formula III include reacting compound represented by structural formula IIIa with an inorganic base at a temperature from about 5° C. to about 55° C., such as from about 10° C. to about 40° C., such as from about 10° C. to about 30° C. (e.g., 10, 11, 12, 13, 14, 15, 16, 17, 18, 19, 20, 21, 22, 23, 24, 25, 26, 27, 28, 29 and 30). The remainder of the values and example values of the variables of the process are as described above with respect to the first through the tenth aspects of the first embodiment.

In a twelfth aspect of the first embodiment, the conditions suitable to produce the compound represented by structural formula III include reacting compound represented by structural formula IIIa with an inorganic base for a period of time from about 1 hours to about 20 hours, such as from abut 1 hour to about 10 hours (e.g., 1, 2, 3, 4, 5, 6, 7, 8, 9 and 10), such as about 2 hours to about 4 hours. The remainder of the values and example values of the variables of the process are as described above with respect to the first through the eleventh aspects of the first embodiment.

In a thirteenth aspect of the first embodiment, the present invention relates to the process, further including isolating the compound represented by structural formula III from a reaction mixture. For example, the present invention relates to the process, wherein isolating the compound represented by structural formula III comprises:
(i) adding water and HCl to the reaction mixture comprising the compound represented by structural formula III, thereby generating an aqueous phase and an organic phase;
(ii) separating, optionally, concentrating the organic phase, thereby generating a final organic phase;
(iii) adding a $C_5$-$C_{12}$ hydrocarbon solvent to the final organic phase, thereby generating a precipitate of the compound represented by structural formula III; and
(iv) isolating the precipitate of the compound represented by structural formula III. For example, the precipitate is isolated by centrifugation or filtration. The remainder of the values and example values of the variables of the process are as described above with respect to the first through the twelfth aspects of the first embodiment.

In a fourteenth aspect of the first embodiment, the $C_5$-$C_{12}$ hydrocarbon solvent is heptane. The remainder of the values and example values of the variables of the process are as described above with respect to the first through the thirteenth aspects of the first embodiment.

In a fifteenth aspect of the first embodiment the $C_5$-$C_{12}$ hydrocarbon solvent is isooctane. The remainder of the values and example values of the variables of the process are as described above with respect to the first through the thirteenth aspects of the first embodiment.

In a sixteenth aspect of the first embodiment, the catalyst and the organic base are present in a combined amount of less than 1 molar equivalent of the compound represented by structural formula II. The remainder of the values and example values of the variables of the process are as described above with respect to the first through the fifteenth aspects of the first embodiment.

In a second example embodiment, the present invention is a process as described hereinabove with respect to the first example embodiment and its $1^{st}$ through $16^{th}$ aspects, further comprising reacting a compound represented by structural formula (IV)

with a hydrazine represented by structural formula (V)

under the conditions suitable to produce a compound represented by structural formula (I), and isolating the compound represented by structural formula (I).

In a first aspect of the second example embodiment, reacting the compound represented by structural formula (IV) with the hydrazine represented by structural formula (V) is performed in the presence of an organic acid, for example formic acid, acetic acid, or propionic acid. In one example, the organic acid is acetic acid The remainder of the values and example values of the variables of the process are as described above with respect to the $1^{st}$ through the $16^{th}$ aspects of the first embodiment.

In a second aspect of the second example embodiment, the conditions suitable to produce the compound represented by structural formula (I) include reacting the compound represented by structural formula (IV) with the hydrazine represented by structural formula (V) at a temperature from 50° C. to 60° C. The remainder of the values and example values of the variables of the process are as described above with respect to the $1^{st}$ through the $16^{th}$ aspects of the first embodiment and the $1^{st}$ of the second example embodiment.

In a third example embodiment, the present invention is a process as described hereinabove with respect to the first example embodiment and its $1^{st}$ through $16^{th}$ aspects, further comprising reacting a compound represented by structural formula (III)

(III)

with a hydrazine represented by structural formula (VI)

(VI)

in the presence of a polar solvent, a second organic base, and a coupling agent under the conditions suitable to produce a compound represented by structural formula (VII), (VII)

;

exchanging the polar solvent for acetonitrile (ACN); and crystallizing the compound represented by structural formula (VII) from the ACN as a crystalline Form D.

In a first aspect of the third example embodiment, the second organic base is selected from the group consisting of DIPEA, Et$_3$N, piperidine, pyridine, and 4-(dimethylamino) pyridine. The remainder of the values and example values of the variables of the process are as described above with respect to the 1$^{st}$ through the 16$^{th}$ aspects of the first embodiment and the 1$^{st}$ and 2$^{nd}$ aspects of the second example embodiment.

In a second aspect of the third example embodiment, the second organic base is DIPEA. The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ aspect of the third example embodiment.

In a third aspect of the third example embodiment, the polar solvent is selected from the group consisting of C$_1$-C$_6$ alcohol, MeTHF, CPME, and MTBE, for example, MeTHF. The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ through 2$^{nd}$ aspects of the third example embodiment.

In a 4$^{th}$ aspect of the third example embodiment, the coupling agent is selected from the group consisting of propylphosphonic anhydride (T3P), 1-Ethyl-3-(3-dimethylaminopropyl)carbodiimide (EDC). For example, the coupling agent is the T3P. The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ through 3$^{rd}$ aspects of the third example embodiment.

In a 5$^{th}$ aspect of the third example embodiment, the conditions suitable to produce the compound represented by structural formula (VII) include reacting the compound represented by structural formula (III) with the hydrazine represented by structural formula (VI) at a temperature from −25° C. to −15° C. The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ through 4$^{th}$ aspects of the third example embodiment.

In a 6$^{th}$ aspect of the third example embodiment, the process further comprising recrystallizing Form D of the compound represented by structural formula (VII) in an aqueous isopropyl alcohol (IPA) under the conditions suitable to produce the crystalline Form A of the compound represented by structural formula (VII). The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ through 5$^{th}$ aspects of the third example embodiment.

In a 7$^{th}$ aspect of the third example embodiments, the conditions suitable for producing Form A of the compound represented by structural formula (VII) comprise: dissolving Form D in the aqueous IPA, thereby producing a slurry; and holding the slurry at a temperature from 38° C. to 42° C. for a time from 5 hours to 12 hours. The remainder of the values and example values of the variables of the process are as described above with respect to the 1$^{st}$ through the 16$^{th}$ aspects of the first embodiment, the 1$^{st}$ and 2$^{nd}$ aspects of the second example embodiment, and the 1$^{st}$ through 6$^{th}$ aspects of the third example embodiment.

In a fourth example embodiment, the present invention is a process as described hereinabove with respect to the first example embodiment and its 1$^{st}$ through 16$^{th}$ aspects, further comprising: reacting a compound represented by structural formula (IV)

(IV)

with a hydrazine represented by structural formula (V)

H$_2$NNH$_2$ (V), under the conditions suitable to produce a compound represented by structural formula (I),

(I)

isolating the compound represented by structural formula (I);
preparing a compound of Formula (III) according to the process described herein (First embodiment and all aspects thereof) and reacting a compound represented by structural formula (III)

(III)

with a hydrazine represented by structural formula (VI)

(VI)

in the presence of a polar solvent, a second organic base, and a coupling agent under the conditions suitable to produce a compound represented by structural formula (VII), (VII)

exchanging the polar solvent for acetonitrile (ACN); crystallizing the compound represented by structural formula (VII) from the ACN as a crystalline Form D; and recrystallizing Form D of the compound represented by structural formula (VII) in an aqueous isopropyl alcohol (IPA) under the conditions suitable to produce the crystalline Form A of the compound represented by structural formula (VII). The remainder of the values and example values of the variables of the process are as described above with respect to the $1^{st}$ through the $16^{th}$ aspects of the first embodiment, the $1^{st}$ and 2nd aspects of the second example embodiment, and the $1^{st}$ through $7^{th}$ aspects of the third example embodiment.

EXEMPLIFICATION

The compounds described in the following examples were identified and analyzed using UHPLC against standard reference compounds. Identities of polymorph crystalline forms were confirmed and analyzed using XRPD.

Example 1. Development of a Telescoped Process for the Synthesis of the Compound Represented by Structural Formula III A telescoped process for the synthesis of the compound represented by structural formula III from the compound of structural formula I has been developed, as shown in Scheme 1.

Telescoping Stages I and II (Scheme 1) of the synthesis of the compound represented by structural formula III by eliminating the need to isolate the compound represented by structural formula IIIa is highly desirable. Telescoping Stages I and II allows for a more efficient process, due to higher overall yield, shorter process time, and fewer manipulations of the solvents and reagents. As described below, an unexpected and surprising combination of multiple reaction parameters was discovered, which permitted the discovery of a new and highly advantageous telescoped process.

As described below, a combination of a catalyst, an organic base, and an ether-containing solvent surprisingly resulted in high conversion rate and stereoselectivity of Stage I of Scheme 1 (synthesis of a compound represented by structural formula IIIa). The compound represented by structural formula IIIa was subjected to hydrolysis without isolation or purification (Stage II, Scheme 1). Employing an inorganic base (e.g., KOH) as the hydrolysis reagent and IPA as the co-solvent in Stage II of Scheme 1 produced the compound represented by structural formula III with unexpectedly high yield and stereoselectivity.

The disclosed process eliminates the need for isolation of the intermediate compound represented by structural formula IIIa.

The experiments presented below show the development of the telescoped process shown in Scheme 1. The compound represented by structural formula II bearing R=Ph (compound II-Ph) was selected for this experiment. The synthetic scheme is shown in Scheme 2. Scheme 2 depicts two isomers of the compound represented by structural formula IIIa (R=Ph). As shown in Scheme 2, the reaction of the compound represented by structural formula I with the compound represented by structural formula II-Ph results in the formation of a mixture of the compound represented by structural formulas Z-IIIa-Ph and the compound represented by structural formulas E-IIIa-Ph, which are the cis-isomer and the trans-isomer of the compound represented by structural formula IIIa, wherein R is phenyl. Since the desired isomer is the Z-isomer (the compound represented by structural formula Z-IIIa-Ph) the efforts were focused on increasing the ratio of Z/E isomers, while simultaneously increasing the overall conversion of the reaction in Stage I.

Scheme 2.

E-IIIa-Ph

1. The Effect of the Amount of DABCO on the Outcome of Stage I

The experiments described below demonstrated that a catalytic amount of DABCO in the presence of an organic base, such as DIPEA, provides the compound represented by structural formula IIIa, wherein R is phenyl, with high conversion and stereoselectivity.

The effect of reducing the DABCO stoichiometry was explored. Using DMF as the solvent, and a 2:1 stoichiometry of the compound represented by structural formula II-Ph to the compound represented by structural formula I and reducing the DABCO stoichiometry from 2, first to 1.1 then to 0.1 relative to the compound represented by structural formula I, selectivity of Stage I was improved (entries 1-3, Table 1). In particular, reduction of the DABCO stoichiometry to 0.1 resulted in an about 99:1 ratio of Z-IIIa-Ph to E-IIIa-Ph.

Further changing the reagent stoichiometry to 1 equivalent of the compound represented by structural formula II-Ph, 1.5 equivalents of the compound represented by structural formula I, and 1.1 equivalents DABCO, but reducing the temperature first to 0° C. to 5° C. and then to −25 to −20° C. showed two notable effects. Firstly, the selectivity of Stage I increased with decreasing temperature (83:17 ratio of the compound represented by structural formula Z-IIIa-Ph to the compound represented by structural formula E-IIIa-Ph observed at 0 to 5° C., and 95:5 ratio of the compound represented by structural formula Z-IIIa-Ph to the compound represented by structural formula E-IIIa-Ph observed at −20 to −25° C.; Table 1, entries 4-5). Secondly, isomerization was observed to occur over time (entries 4-6, Table 1).

Reducing the amount of DABCO to 0.95 eq. with respect to both the compound represented by structural formula II-Ph and the compound represented by structural formula I, showed good selectivity and no isomerization over time. This suggested that isomerization of the double bond may be an effect associated with the excess of free DABCO, where free DABCO is defined as being unprotonated and free from excess iodoacrylate. Further review of the experiments (for example, entries 4 and 5 compared to entries 3 and 7, Table 1) showed that in cases where the total amount of equivalents of DABCO was less than 1 compared to the compound represented by structural formula II-Ph, the isomerization of the compound represented by structural formula IIIa, wherein R is phenyl, was slower or even halted. This observation suggested that if the DABCO was rendered unreactive (either by it being attached to the double bond of the iodoacrylate, or as the hydroiodic acid salt) and not available as the free base, the reaction could be made more robust.

It was also demonstrated that the yield and selectivity of the reaction in Stage I were particularly advantageously high when a catalyst (e.g., DABCO) and an organic base (e.g. DIPEA) was added to the reaction mixture, and the total amount of equivalents of the catalyst and the organic base was less than 1 equivalent of the compound represented by structural formula II-Ph.

As an added benefit, the reaction conditions in the presence of catalytic amounts DABCO did not require the use of 2 equivalents of the compound represented by structural formula II-Ph to drive the reaction to completion. As little as 1.2 equivalents was found to be effective in providing 94% conversion (Table 1, entry 8).

Since DMF is not a desirable solvent for the hydrolysis conditions in Stage II, other solvents were explored for Stage I. The experiments described below showed that MeTHF is an advantageous solvent for Stage I, providing high conversion and selectivity.

The effect of polarity of the solvent in the reaction of Stage I was examined. Reducing the polarity of the solvent (from DMF to either toluene or MeTHF) gave improved ratios of the compound represented by structural formula Z-IIIa-Ph to the compound represented by structural formula E-IIIa-Ph (from approximately 80:20 in the case of DMF, as shown in Table 1, entry 8, to as high 95:5 in the case of MeTHF, see Table 2). The reduced polarity of the solvent

TABLE 1

Summary of the screening studies for the reaction in Stage I.

| Entry | Temp., (° C.) | Eq. of I | Eq. of II-Ph | Eq. of DABCO | Eq. of DIPEA | Time[a] | Z-IIIa-Ph, % | E-IIIa-Ph, % | Conv.[b], % |
|---|---|---|---|---|---|---|---|---|---|
| 1 | RT | 1 | 2 | 2 | 0 | 0 min | 14 | 86 | >99 |
|  |  |  |  |  |  | 1 h | 13 | 87 |  |
|  |  |  |  |  |  | 3 h | 14 | 86 |  |
| 2 | RT | 1 | 2 | 0.1 | 0 | 0 min | >99 | <1 | 23 |
|  |  |  |  |  |  | 1 h | >99 | <1 |  |
|  |  |  |  |  |  | 2 h | >99 | <1 |  |
| 3 | RT | 1 | 2 | 1.1 | 0 | 0 min | 23 | 77 | 94 |
|  |  |  |  |  |  | 1 h | 23 | 77 |  |
|  |  |  |  |  |  | 3 h | 24 | 76 |  |
| 4 | 0 to 5 | 1.5 | 1 | 1.1 | 0 | 2 min | 82.5 | 17.5 | >99 |
|  |  |  |  |  |  | 45 min | 15.0 | 85 |  |
| 5 | −20 to −25 | 1.5 | 1 | 1.1 | 0 | 0 min | 95 | 5 | >95 |
|  |  |  |  |  |  | 45 min | 80 | 20 |  |
|  |  |  |  |  |  | 4 h | 50 | 50 |  |
| 6 | 0 to 5 | 1 | 2 | 2 | 0 | 0 min | 26.5 | 73.5 | >95 |
|  |  |  |  |  |  | 45 min | 16.5 | 83.5 |  |
|  |  |  |  |  |  | 2 h | 9 | 91 |  |
| 7 | RT | 1 | 1 | 0.95 | 0 | 0 min | 97 | 3 | 64 |
|  |  |  |  |  |  | 1 h | 97 | 3 |  |
| 8 | RT | 1 | 1.2 | 0.1 | 1 | 0 min | 77 | 23 | 94 |
|  |  |  |  |  |  | 1 h | 78 | 22 |  |

[a]Time 0 minutes corresponds to the moment when the last drop of the last reagent is added;
[b]Conversion was calculated by dividing the molar amount of the compound represented by structural formula I by the sum of the molar amounts of the compounds represented by structural formulas I, ZrIIIa-Ph, and E-IIIa-Ph.

The experiments described above demonstrate that under certain conditions catalytic amount of DABCO in the presence of an organic base, such as DIPEA, delivers the compound represented by structural formula IIIa, wherein R is phenyl, with high conversion and stereoselectivity.

2. Solvent Effect on the Outcome of Stage I.

Studies were conducted to determine the effect of solvent on the conversion rate and stereoselectivity of Stage I, as well as on telescoping Stages I and II.

lowered the rate of both the desired reaction and the isomerization. MeTHF offered higher selectivity and comparable activity, compared to toluene (Table 2, entries 2-4). The high conversion and selectivity of the process of Stage I using MeTHF and performing the reaction at room temperature offered the possibility of using this solvent as the carrier in a telescoped process, linking the process in Stage I with the subsequent hydrolysis step, Stage II.

TABLE 2

Summary of the solvent screening studies for the reaction in Stage I.

| Entry | Solvent | Eq. of I | Eq. of II-Ph | Eq. of DABCO | Eq. of DIPEA | Time | Z-IIIa-Ph, % | E-IIIa-Ph, % | Conv., % |
|---|---|---|---|---|---|---|---|---|---|
| 1 | PhMe | 1.5 | 1 | 1.1 | 0 | 5 min | 98 | 2 | 78 |
|  |  |  |  |  |  | 3 h | 94.8 | 5.2 |  |
|  |  |  |  |  |  | 20 h | 92.2 | 7.8 |  |
| 2 | PhMe | 1 | 1.2 | 0.1 | 1 | 5 min | 86.8 | 13.2 | >95 |
|  |  |  |  |  |  | 20 h | 81 | 19 |  |
| 3 | MeTHF | 1 | 1.1 | 1.1 | 1.1 | 5 min | 95 | 5 | >95 |
|  |  |  |  |  |  | 3 h | 89.7 | 10.3 |  |
|  |  |  |  |  |  | 20 h | 43.5 | 56.5 |  |
| 4 | MeTHF | 1 | 1.2 | 0.1 | 1 | 30 min | 95.3 | 4.7 | 90.5 |
|  |  |  |  |  |  | 20 h | 91.7 | 8.3 | >95 |
| 5 | MeTHF | 1 | 1.2 | 0.1 | 1 | 30 min | 94.3 | 5.7 | 99 |
|  |  |  |  |  |  | 20 h | 91.7 | 8.3 | 99 |

TABLE 2-continued

Summary of the solvent screening studies for the reaction in Stage I.

| Entry | Solvent | Eq. of I | Eq. of II-Ph | Eq. of DABCO | Eq. of DIPEA | Time | Z-IIIa-Ph, % | E-IIIa-Ph, % | Conv., % |
|---|---|---|---|---|---|---|---|---|---|
| 6 | MeTHF | 1 | 1.2 | 0.1 | 1 | 30 min | 94.5 | 5.5 | 96 |
|   |       |   |     |     |   | 20 h   | 90.6 | 9.4 | >99 |

Using MeTHF as solvent in Stage I results in high conversion and selectivity of the compound represented by structural formula IIIa. It consequently provides an opportunity for telescoping of Stage I and Stage II, thus eliminating the step of isolating the compound represented by structural formula IIIa and the associated material losses.

3. Effect of the Metal Hydroxide and Co-Solvents in Stage II.

Referring to Scheme 3, Stage II, experiments were conducted to determine different combinations of inorganic bases and solvents. It was determined that inorganic bases such as NaOH and KOH, when used as the hydrolysis reagent, and IPA, when used as a co-solvent along with MeTHF and water, provide the compound of structural formula III with advantageous yield and stereoselectivity.

Scheme 3.

Stage I

IIIa-iPr not isolated

Stage II

Z-III

+

E-III

Lithium hydroxide was originally chosen as the hydrolysis reagent, since it is frequently used in ester hydrolysis processes due to the favorable reaction kinetics it provides. Hydrolysis of the compound represented by structural formula IIIa-iPr with lithium hydroxide (5 equivalents) in MeTHF was relatively slow in the absence of IPA or other phase transfer agents (Table 3, entries 1-4). The process was also accompanied by significant isomerization, which resulted in production of the undesired compound represented by structural formula E-III.

Additionally, LiOH is not a preferred reagent for pharmaceutical applications. Pharmaceutical intermediates and final products produced with the use of LiOH have to be closely monitored for Li levels, since Li salts themselves are pharmaceutically active compounds. Therefore, NaOH and KOH were examined as alternatives to LiOH (Table 3, entries 5-12, 17-24).

IPA was examined as a co-solvent for its ability to promote reaction between the organic and aqueous phases by imparting partial miscibility. The presence of IPA as a co-solvent significantly improved the outcome of the hydrolysis process (Table 3, entries 13-24).

TABLE 3

Summary of the screening experiments of the hydrolysis process of Stage II.

| | | | Hydrolysis Results | | |
|---|---|---|---|---|---|
| Entry | Hydrolysis conditions | Time, h | Phase | IIIa-iPr, % | Z-III, % | E-III, % |
| 1 | LiOH[a] | 2 | org. | 87.29 | 4.69 | 0.34 |
| 2 | | | aq. | trace | trace | trace |
| 3 | | 4 | org. | 79.59 | 15.09 | 0.59 |
| 4 | | | aq. | 37.32 | 27.48 | 1.8 |
| 5 | NaOH | 2 | org. | 89.18 | 1.31 | 0.23 |
| 6 | | | aq. | trace | trace | trace |
| 7 | | 4 | org. | 86.77 | 3.41 | 0.32 |
| 8 | | | aq. | 61.11 | 3.86 | 0.37 |
| 9 | KOH | 2 | org. | 89.99 | 0.94 | 0.25 |
| 10 | | | aq. | trace | trace | trace |
| 11 | | 4 | org. | 90.26 | 1.50 | 0.24 |

TABLE 3-continued

Summary of the screening experiments of the hydrolysis process of Stage II.

| Entry | Hydrolysis conditions | Time, h | Phase | Hydrolysis Results | | |
|---|---|---|---|---|---|---|
| | | | | IIIa-iPr, % | Z-III, % | E-III, % |
| 12 | | | aq. | trace | trace | trace |
| 13 | LiOH, IPA[b] | 2 | org. | 53.92 | 42.27 | 1.28 |
| 14 | | | aq. | 1.51 | 89.92 | 3.21 |
| 15 | | 4 | org. | 0.26 | 94.43 | 4.18 |
| 16 | | | aq. | ND | 95.44 | 3.74 |
| 17 | NaOH, IPA | 2 | org. | 42.59 | 53.03 | 1.51 |
| 18 | | | aq. | 6.95 | 77.74 | 1.90 |
| 19 | | 4 | org. | 0.55 | 94.61 | 3.76 |
| 20 | | | aq. | ND | 95.92 | 3.32 |
| 21 | KOH, IPA | 2 | org. | 3.67 | 91.19 | 3.51 |
| 22 | | | aq. | ND | 95.92 | 3.23 |
| 23 | | 4 | org. | ND | 95.11 | 3.95 |
| 24 | | | aq. | ND | 97.03 | 2.28 |

[a]Addition of 5 eq. of metal hydroxide (LiOH, NaOH, or KOH) in 5 volume equivalents of water with respect to the volume of the compound represented by structural formula I;
[b]Addition of 2 volume equivalents of IPA with respect to the volume of the compound represented by structural formula I.

In this experiment, the reaction of Stage I was carried out under the following conditions:

Compound represented by structural formula I (12 g) and DABCO (0.1 eq, 0.48 g) were dissolved in MeTHF, followed by addition of the compound represented by structural formula II-iPr (1.2 eq, 12.3 g) and DIPEA (1.0 eq, 7.4 mL).

The reaction mixture was agitated for 20 h, then washed with 5 volume equivalents of water (with respect to the volume of the compound represented by structural formula I).

An aliquot was removed (⅙ of the reaction mixture), and treated with the reagents according to the hydrolysis conditions in Table 3.

The data in Table 3 demonstrate that, compared to LiOH, both NaOH and KOH provided improved rate of hydrolysis of the compound represented by structural formula IIIa-iPr, while keeping Z/E isomerization levels low. Additionally, the data in Table 3 show that IPA improved both the conversion and stereoselectivity of Stage II of Scheme 3.

Example 2. Synthesis of the Compound Represented by Structural Formula III

The example below discloses the synthesis of the compound represented by structural formula III on a 1.0 kg scale. The compound represented by structural formula III is synthesized at a 72-75% yield, with greater than 99% purity (UPLC).

A 50 L glass reactor, under nitrogen, was charged with 1.000 kg of the compound represented by structural formula I (1 eq.), 40 g DABCO (0.1 eq), and 2.559 kg MeTHF, and the mixture was stirred to dissolve.

To this mixture was added 1.040 kg of the compound represented by the compound of structural formula II, wherein R is an isopropyl group (1.2 eq), and the funnel was rinsed forward with 0.853 kg of MeTHF.

To this mixture via addition funnel was added 460 g of DIPEA (1.0 eq), and the funnel was rinsed forward with 0.853 kg of MeTHF.

The mixture was agitated at 20 to 25° C. for 16 h and then sampled for reaction completion.

To the vessel, with moderate agitation and maintaining the temperature at 20 to 25° C. was added 5.0 kg DD water, and the resulting mixture was agitated for 20 min.

Agitation was stopped, and the layers were allowed to separate. The lower aqueous layer was removed and discarded.

To the upper organic layer, with moderate agitation and maintaining the temperature at 20 to 25° C. was added a solution of 30 g 37% HCl in 2.975 kg water, followed by 1.18 kg brine.

The mixture was agitated at 20 to 25° C. for 20 min, then the agitation was stopped and the layers were allowed to separate. The lower aqueous phase was removed and discarded.

To the vessel was added, with moderate agitation at 20 to 25° C., 1.57 kg of IPA.

To the reaction mixture, with moderate agitation, maintaining the temperature at 20 to 25° C. was added a solution of 1.174 kg KOH (5 eq) in 5.0 kg DD water.

The mixture was agitated at 20 to 25° C. for 3 h and then sampled for reaction completion.

Following reaction completion, 5.935 kg brine was added to the mixture with moderate agitation.

The batch was vigorously agitated at 20 to 25° C. for 20 min. Then the agitation was stopped and the layers were allowed to separate. The lower aqueous layer was separated and discarded.

To the organic layer, with vigorous agitation, was added 1.998 kg DD water, followed by agitation for 20 min.

With vigorous agitation, the pH of the mixture (lower phase) was adjusted to a target of 0 to 2 with 0.934 kg of 5M HCl solution (aq.).

With moderate agitation, the temperature of the batch was increased to 50 to 55° C., and the agitation was maintained for 20 min. While maintaining the temperature at 50 to 55° C., the lower aqueous layer was separated and discarded.

The retained organic phase was cooled to 0 to 5° C., then distilled to a target volume of 3 L.

Upon completion of the distillation, the batch temperature was increased to 50 to 55° C. and held at that point for 1 h.

While maintaining the temperature at 50 to 55° C. and with moderate agitation, 5.645 kg isooctane was added to the vessel over a minimum of 30 min.

Following addition of the isooctane, the temperature was adjusted to 20 to 25° C. over a minimum of 60 min and then held at 20 to 25° C. for a minimum of 1 h.

The batch was cooled 0 to 5° C. over a minimum of 1 h, then held at that temperature for at least 1 h.

The batch was filtered and the filter cake washed with 2.145 kg isooctane at 0 to 5° C.

The filtered product was dried under a stream of nitrogen on the filter until dry.

Yield of the compound represented by structural formula III 72-75%, purity greater than 99% (UPLC).

Example 3. Synthesis of the Compound Represented by Structural Formula III

The example below discloses the synthesis of the compound represented by structural formula III on a 100 kg scale. The compound represented by structural formula III is synthesized in 75±10% yield, with greater than 99.7% purity (UPLC). In this example, the solids of the compound represented by structural formula III are precipitated with heptane, as opposed to Example 2, where the solids of the compound represented by structural formula III are precipitated with isooctane.

A 4000 L clean, inert glass-lined reactor was charged with the compound of structural formula I (1 eq), DABCO (0.1 eq), and MeTHF, and the resulting mixture was agitated at 15/20° C. under nitrogen for at least 15 min to dissolve.

The temperature of the mixture was adjusted to 10/20° C., and the compound represented by the compound of structural formula II, wherein R is an isopropyl group (1.2 eq) was added.

The mixture was then charged with a MeTHF rinse. DIPEA, (1.0 eq) was added to the mixture at 10/20° C. (target temp 10° C.), followed with a MeTHF rinse at 10/20° C.

The resulting reaction mixture was agitated at 15° C. until the reaction was confirmed complete (at least 12 h), adjusting the stirring speed as necessary to maintain a vigorously stirred mixture.

The reaction mixture was held at 15° C. for at least 2 h with stirring.

Water was added to the reaction mixture, while maintaining the mixture temperature of 10/25° C. The mixture was agitated for at least 15 min at 15/20° C., allowed to separate, and the lower first aqueous phase was removed.

The remaining organic phase was transferred to a new, dry and inert 6000 L glass-lined reactor followed by a MeTHF rinse.

In a clean, inert glass-lined reactor, the quench solution was prepared by charging water, sodium chloride and hydrochloric acid, and mixed for at least 30 min at 15/25° C. until dissolved.

The prepared quench solution was added to the second reactor containing the organic phase (6000 L reactor) and mixed for at least 15 min at a mixture temperature of 15/20° C. (little to no exothermicity).

The mixture was allowed to settle for at least another 15 min at 15/20° C. to allow separation of the aqueous and organic layers. The aqueous phase was removed, leaving the interphase, if any, with the organic phase.

A reactor was rinsed with water and dried before it was charged with water and KOH and mixed for at least 30 min at 15/25° C.

To the organic phase in the 6000 L reactor, IPA was added, and the mixture was stirred for 5-10 min at 15/25° C.

At 15° C., the water/KOH solution from the third reactor was added, holding the second reactor temperature at 15/25° C. (addition was exothermic) to the organic phase, thereby generating the reaction mixture.

Then the reaction mixture in a 6000 L glass-lined reactor was stirred for at least 2 h under nitrogen at 20/25° C. and then sampled. If noncompliant, the reactor was held with stirring for at least another 2 h under nitrogen at 20/25° C. to form the compound represented by structural formula III If compliant, the reaction was quenched.

To a separate reactor, water and sodium chloride are added and stirred for at least 30 min at 15/25° C. until dissolved.

The sodium chloride solution was charged into the reaction mixture and vigorously stirred for at least 15 min at 15/25° C. and then left to settle for at least 15 min.

The aqueous phase was removed leaving behind the interphase, if any, and the organic phase.

The reactor was rinsed with water and dried before it was charged with water and HCl and mixed for at least 10 min at 20/25° C.

To the organic phase in the 6000 L reactor, water was added at 15/25° C. and held without stirring for 5-10 min and the total volume was recorded.

Stirring was restarted and the required amount of the HCl solution was added to obtain the target pH of 0.5-2.0 and mixed for at least 10 min at 15/25° C.

The mixture was heated to 50/55° C. until the compound represented by structural formula III was solubilized, stirred for 10 min, and then allowed to settle for at least 15 min (bulk temperature 50/55° C.).

The aqueous phase was removed, leaving the interphase with the organic layer, and discarded.

The organic phase was cooled under vacuum to 30/40° C. and concentrated to approximately 3 volume equivalents. Once the concentration process was completed, the final organic phase was heated to 50/55° C.

Over not less than 1 hour, 99% heptane was added to the final organic phase in the second reactor with an internal temperature of 50/55° C.

The mixture was cooled to 0/5° C. over at least 3 h and stirred at said temperature for at least 1.5 h.

Cake rinse was prepared by combining MeTHF and 99% heptane.

The slurry was centrifuged into a series of equivalent cakes and each cake was washed with the MeTHF/heptane mixture.

Compound represented by structural formula III was transferred into a stirred dryer and dried under vacuum until the product appears dry and homogenous.

Compound represented by structural formula III was obtained in 75±10% yield, >99:1 Z/E ratio and >99.7% purity.

Example 4: Synthesis of the Compound Represented by Structural Formula (I)

Compound (IV) and acetic acid, 99% (4.2 wts) were charged to a clean, inert glass-lined reactor under a nitrogen headspace and held at or below 25/35° C. with stirring until Compound (IV) was dissolved.

Bulk temperature was adjusted to 20/25° C., and then 1.4 molar eq. of neat hydrazine monohydrate (compound (V)) (0.225 wts) was charged to the vessel (exothermic) in NMT 90 min, while maintaining a temperature of 20/30° C.

Upon completion of the addition, the batch temperature was increased to 55° C. and stirred (80 rpm) for at least 5 to 16 hours until the reaction is complete (assessed by UHPLC).

Once the completion of the reaction was confirmed, crystallization was initiated by the slow, uniform addition of demineralized or purified water (referred to as "water" in the descriptions below) (5 wts) to the mixture over a minimum time of 2.5 hours while maintaining the internal temperature of 55° C. with stirring.

An additional 5 wts of water were added to the mixture over a minimum time of 1 hour with the temperature range set point of 55° C.

The mixture was stirred at 55° C. for at least 30 minutes. After nucleation had been confirmed, the crystallization was slowly cooled to 20/25° C. over a minimum time of 3 hours, where it is stirred for at least 1 hour at 20/25° C.

Compound (I) product was isolated by centrifugation, washed with water (12 wts), transferred to a stirred dryer, and dried under vacuum until dry and homogenous. Drying continued until water content and solvent content met specifications.

The dried product is cooled to <30° C. and packaged.

Example 5: Synthesis of the Compound Represented by Structural Formula (VII) Form D Compound (III), compound (VI) (0.335 wts±2%), and MeTHF (5.8 wts) were charged to a 4000 L dry, inert glass-lined reactor and the mixture was stirred for NLT 15 minutes at 15/20° C. under nitrogen.

The mixture was cooled to −20/−25° C. DIPEA (0.846 wts±2%) was then added to the mixture with a MeTHF rinse (0.26 wts) while maintaining a temperature between −20/−25° C. (exothermic).

A commercial 50% propylphosphonic anhydride (T3P) solution (1.22 wts 2% on a neat T3P° basis) was slowly added to the mixture over NLT 6 hours, at a temperature of NMT−20° C. followed with a MeTHF rinse (0.86 wts). After stirring the mixture for NLT 30 minutes between −20/−25° C. under nitrogen, the mixture temperature was adjusted to 10/15° C. with rapid stirring. Once the temperature was reached, a sample was taken for reaction monitoring (UHPLC using a known reference).

When the reaction was compliant by UHPLC it was diluted with MeTHF (0.43 wts) and quenched with purified water (5 vol.) at 10/15° C. with agitation.

The biphasic mixture was agitated for NLT 15 minutes at 15/25° C. and then the layers were settled for at least 30 minutes at 15/25° C. before the aqueous layer (bottom) was removed.

The retained interphase, if any, and the organic layer were washed with water (4.7 vol.) and sodium chloride (0.3 wts) under vigorous agitation for NLT 25 minutes at 15/25° C.

After the mixture was settled for NLT 30 mins at 15/25° C., the aqueous layer (bottom) and the interphase, if any, were removed. The remaining organic phase was stirred slowly for NMT 5 minutes at 15/25° C., allowed to settle for NLT 15 minutes, and any additional settled aqueous phase was removed.

The organic layer was placed under vacuum heat the mixture to 35/45° C. at the jacket temperature of NMT 55° C. The mixture was concentrated at 20/45° C. until a residual volume of 5 volumes was reached.

Once the concentration process had been completed, the mixture temperature was cooled to 20/25° C.

The organic mixture was filtered and transferred to the concentration vessel with a MeTHF rinse (0.43 wts).

The MeTHF solution was heated to 35/45° C. at the jacket temperature of NMT 55° C. and add filtered ACN (7.8 wts). Solvent exchange was performed via distillation while maintaining a mixture temperature of 20/45° C. during the concentration with a jacket temperature of NMT 55° C. until approximately 10 volumes was reached.

Filtered ACN (3.9 wts) was added to the organic concentrate and held at 20/45° C. for NLT 15 min. The mixture was concentrated at 20/45° C. under vacuum at the jacket temperature of NMT 55° C. until approximately 10 volumes was reached.

The filtered ACN charge (3.9 wts) was repeated and the mixture concentrated to 10 volumes, after which filtered ACN (3.9 wts) was added, and stirred for NLT 15 min at 20/45° C.

Once the MeTHF content met specifications (assessed by GC), the organic mixture was heated to 65±2° C. with a jacket temperature of NMT 75° C. and held for 15/30 minutes.

The organic mixture was transferred to crystallization vessel with an ACN (16 kg) rinse. The mixture temperature was adjusted to 65±2° C. if necessary and held for 15/30 minutes.

The mixture was cooled down to 20/25° C. over NLT 3 hours, stirred for 1 to 2 hours at 20/25° C., then the mixture was further cooled down to 0/5° C. over NLT 3 hours with agitation. The mixture was held at 0/5° C. for NLT 1 hour.

The crystallized mixture was centrifuged into a series of equivalent cakes (maximum cake size of 30 kg of wet cake) and each cake was washed with chilled, filtered ACN (141 kg/180 L). The 141 kg/180 L cake wash was equivalent to NLT 10 vol. ACN if the cake is 30 kg or less).

The mother liquors and washing liquors were removed. After gentle agitation at atmospheric pressure and ambient temperatures for 4-6 hours, the filter cakes were dried under vacuum (jacket temperature NMT 45° C.) until the product appeared dry and homogenous. The process is complete when criteria for loss on drying were met.

Example 6: Conversion of Crystalline Polymorph Forms of the Compound Represented by Structural Formula (VII); Preparation of Form A Form D and Form A referred herein are Form A and Form D as described in U.S. Pat. No. 10,519,139, the entire content of which is hereby incorporated by reference.

Synthetic Scheme 6

IPA/water, 40 ± 2° C.
Then water and cool to 15/20° C.
90 ± 10% yield (VII), Form D (VII), Form A Compound (VII) Form D was charged to a 4000 L dry, inert, glass-lined reactor with filtered IPA (2.4 wts) and stirred. Purified water (3 wts) was added to the mixture.

The temperature was increased and then held at 40±2° C. for at least 5 hours but not more than 12 hours to affect the polymorph conversion from Form D to Form A.

The slurry was then cooled 15/20° C. over at least 1 hour, and purified water (10 wts) was added at 15/20° C. with stirring.

The mixture was transferred followed by a water rinse (200 L) to a 6000 L dry, inert, glass-lined reactor and the temperature was held at 15/20° C. while mixing for at least one hour.

In a separate reactor, filtered IPA (0.79 wts) and water (4 wts) were added and stirred for a minimum of 10 minutes, then the solvent mixture was transferred into clean dedicated containers for cake washing.

The minimum number of centrifuge cakes was calculated to ensure individual cake sizes were not more than 40 kg of wet cake, and the slurry was centrifuged into approximately equivalent cakes of not more than 40 kg each.

Each centrifugation cake was washed with a fixed volume of IPA/water solution (150 L) before unloading from the centrifuge.

The mother liquors and washing liquors were collected. A fraction of the mother liquors could be used for residual rinse of the centrifuge, if required. The filter cakes were pooled and dried under vacuum (maximum jacket temperature at 45° C.) until the product appears dry and homogenous.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A process of making a compound represented by structural formula III, (III)

the process comprising:
reacting a compound represented by structural formula (I) with a compound represented by structural formula (II), (I)

(II)

in the presence of a catalyst 1,4-diazabicyclo[2.2.2]octane (DABCO), an organic base selected from Et3N, diisopropylethyamine (DIPEA), piperidine, pyridine, and 4-dimethylaminopyridine (DMAP), and an ether-containing solvent selected from cyclopentyl methyl ether (CPME), methyl tert-butyl ether (MTBE), and methyltetrahydrofuran (MeTHF) under the conditions suitable to produce a compound represented by structural formula (IIIa), (IIIa)

and wherein the catalyst is present in an amount from 0.05 to 0.2 molar equivalents based on the amount of the compound represented by structural formula I;

without isolating, reacting the compound represented by structural formula (IIIa) with an inorganic base in the presence of isopropyl alcohol (IPA) under conditions suitable to produce a compound represented by structural formula (III);

wherein the inorganic base is a metal hydroxide selected from LiOH, NaOH, and KOH; and isolating the compound represented by structural formula (III), wherein R is a $C_2$-$C_5$ alkyl or a $C_6$-$C_{18}$ aryl.

2. The process of claim 1, wherein R is isopropyl or a phenyl.

3. The process of claim 1, wherein the catalyst and the organic base are present in a combined amount of less than 1 molar equivalent of the compound represented by structural formula II.

4. The process of claim 1, wherein the catalyst is present in an amount of 0.1 molar equivalents based on the amount of the compound represented by structural formula I.

5. The process of claim 1, wherein the organic base is present in the amount from 0.5 to 2 molar equivalents based on the amount of the compound represented by structural formula I.

6. The process of claim 1, wherein the organic base is present in the amount of 1.0 molar equivalents based on the amount of the compound represented by structural formula I.

7. The process of claim 1, wherein the amount of the compound of structural formula II is from 1.0 to 1.5 molar equivalents based on the amount of compound of structural formula I.

8. The process of claim 1, wherein the conditions suitable to produce the compound represented by structural formula IIIa include reacting the compound represented by structural formula I with the compound represented by structural formula II at a temperature from 5° C. to 55° C.

9. The process of claim 1, wherein the conditions suitable to produce the compound represented by structural formula III include reacting the compound represented by structural formula IIIa with an inorganic base at a temperature from 5° C. to 55° C.

10. The process of claim 1, further including isolating the compound represented by structural formula III from a reaction mixture.

11. The process of claim 10, wherein isolating the compound represented by structural formula III comprises:
    (i) adding water and HCl to the the reaction mixture comprising the compound represented by structural formula III, thereby generating an aqueous phase and an organic phase;
    (ii) separating and, optionally, concentrating the organic phase, thereby generating a final organic phase;
    (iii) adding a $C_5$-$C_{12}$ hydrocarbon solvent to the final organic phase, thereby generating a precipitate of the compound represented by structural formula III; and
    (iv) isolating the precipitate of the compound represented by structural formula III.

12. The process of claim 11, wherein the $C_5$-$C_{12}$ hydrocarbon solvent is heptane or isooctane.

* * * * *